April 12, 1949.	V. NACHAZEL	2,466,961
TRIMMING DEVICE FOR THE EDGES
OF MOLDED ARTICLES
Filed July 23, 1945	9 Sheets-Sheet 1

VACLAV-NACHAZEL Inventor

Inventor
VACLAV NACHAZEL
By Emery Holcombe & Blair
Attorney

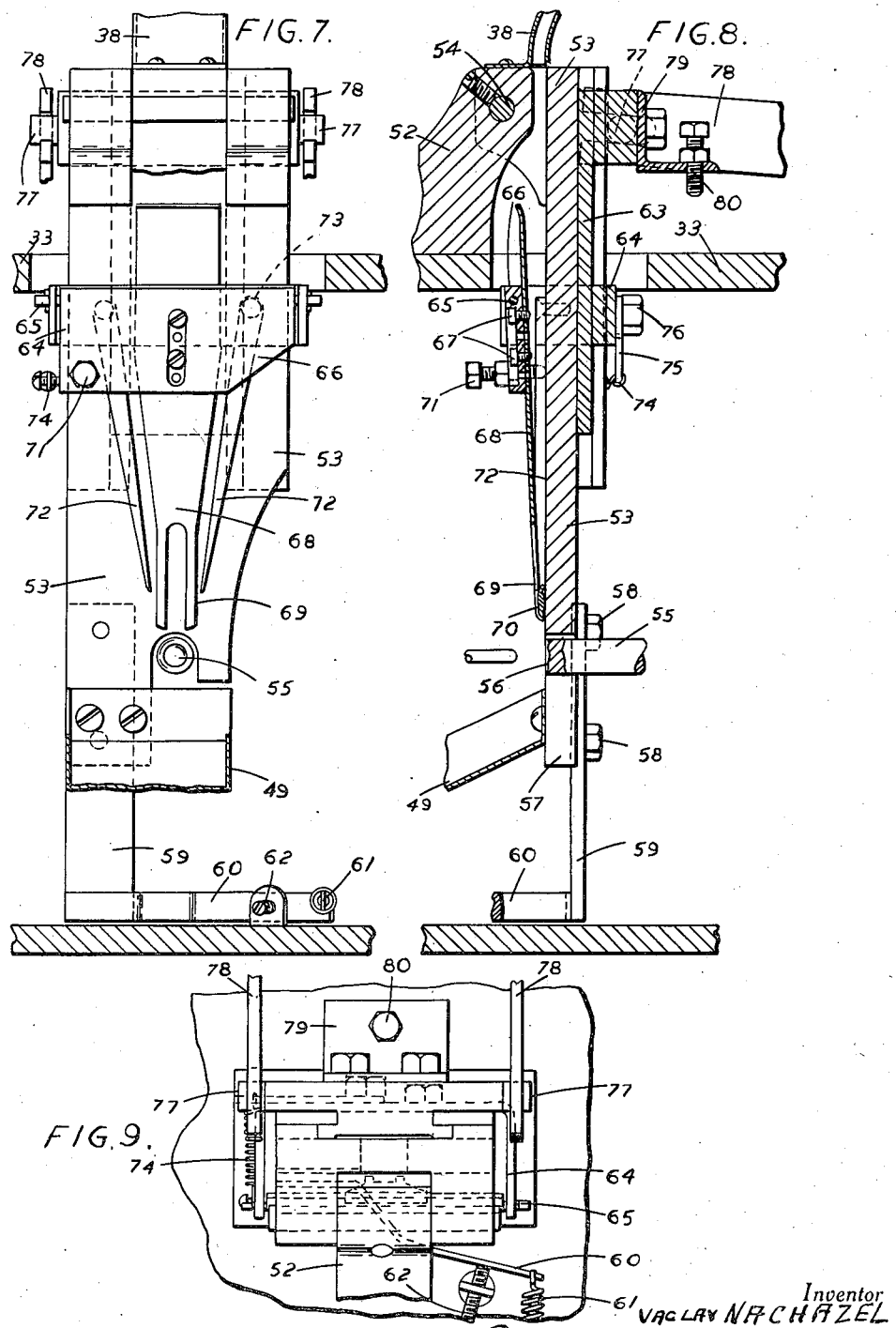

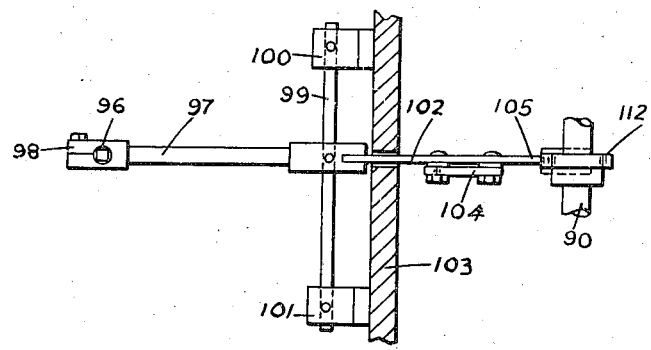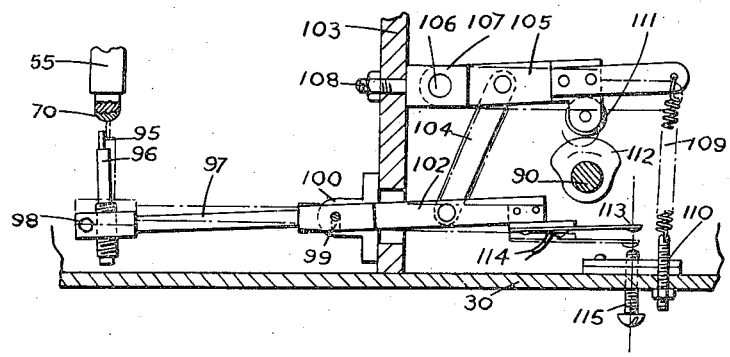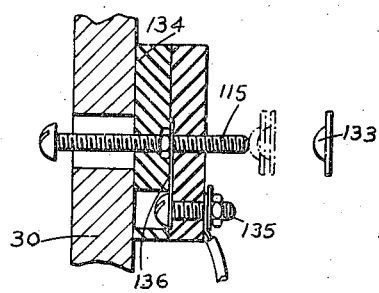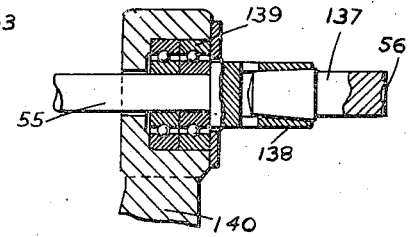

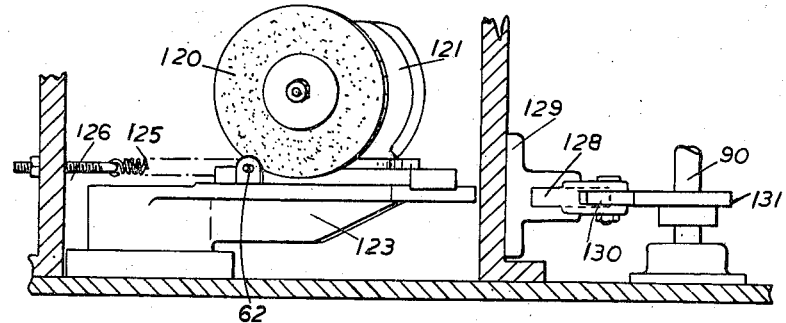
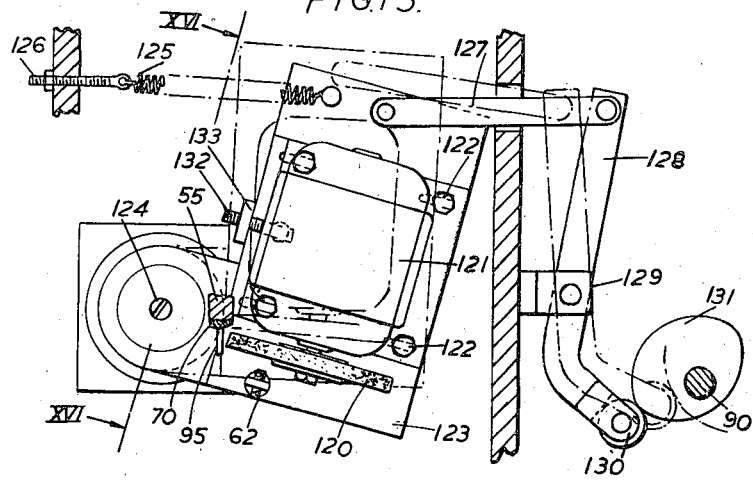
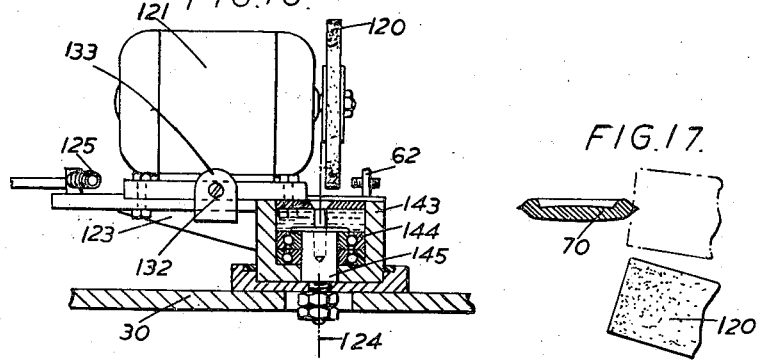
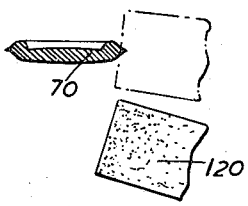

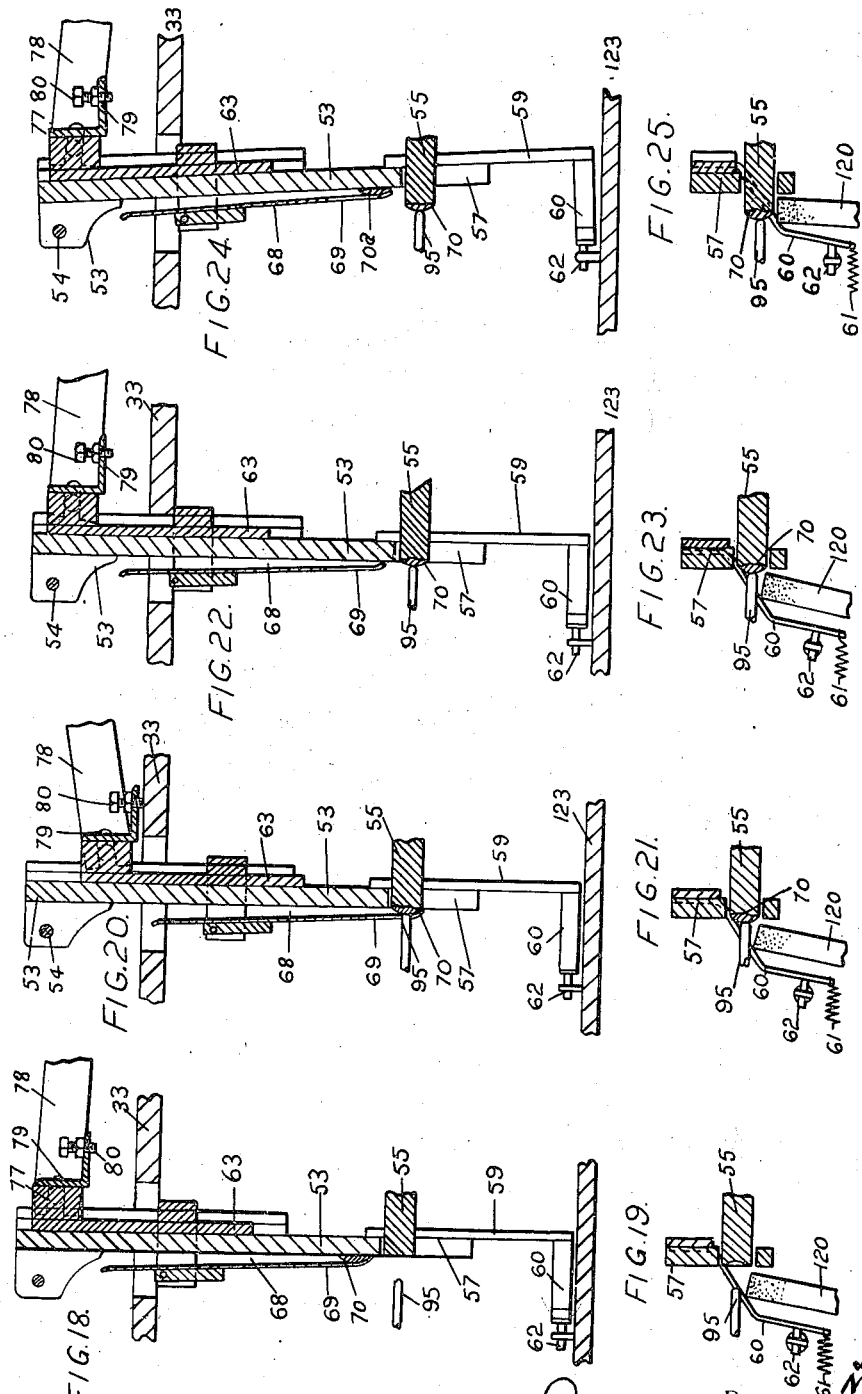

April 12, 1949.
V. NACHAZEL
2,466,961
TRIMMING DEVICE FOR THE EDGES OF MOLDED ARTICLES
Filed July 23, 1945
9 Sheets-Sheet 9
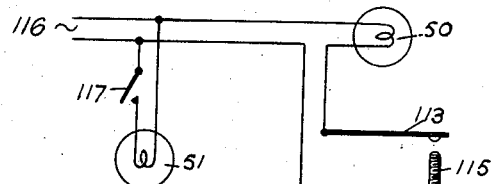
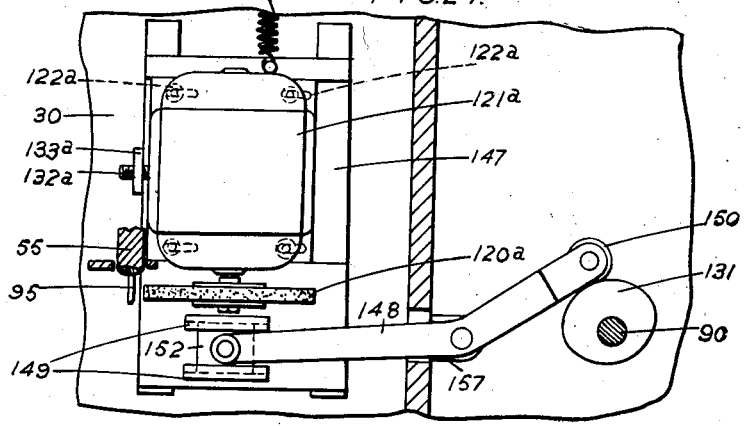
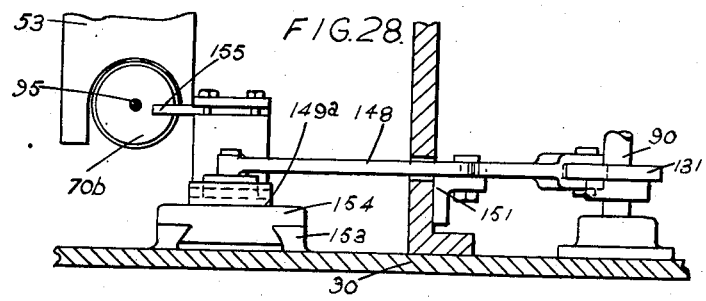
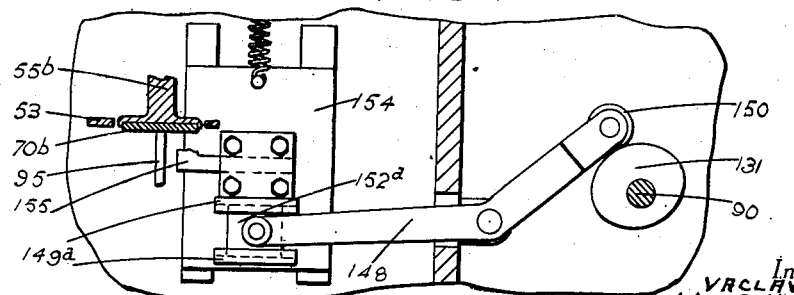
Inventor
VACLAV NACHAZEL
By Emery Holcombe & Blair
Attorney Patented Apr. 12, 1949

2,466,961

UNITED STATES PATENT OFFICE 2,466,961

TRIMMING DEVICE FOR THE EDGES OF MOLDED ARTICLES

Vaclav Nachazel, Maryport, England, assignor to Messrs. Hornflowa Limited, Maryport, England, a company of Great Britain Application July 23, 1945, Serial No. 606,618
In Great Britain June 15, 1944

6 Claims. (Cl. 79—10)

This invention relates to trimming devices for round articles such as discs and buttons, particularly for moulded articles, whether of metal or plastic materials and so forth. It is the principal object of the invention to provide a machine which will remove from the surface of such articles, generally a circumferential surface, any flash or other projections so that the surface shall be smooth and uniform. Other objects are to improve the feeding of the blanks to be treated to the operating position, to insure that the blanks are correctly presented to the tool which operates upon them, and that they are securely held and centred during treatment. Another object is so to arrange the mechanism that as far as possible the parts which engage with and operate upon the blanks shall do so under spring action, their disengaging or return movements being positively actuated, in order that damage or breakage may be avoided in case of obstruction due to wrong presentation of blanks or otherwise. The invention is especially useful for removing the projecting edges or flash from articles such as buttons moulded by compression in open flash moulds, and it will be described in this connection, although the invention is not limited thereto.

The machine forming the subject of the present invention is designed to provide a simple and inexpensive appliance which will be fully automatic in operation, will give a large output, and whose products shall be substantially free from defects. For this purpose the machine comprises an automatic collecting device (which may be of a known type) taking button blanks from a hopper and delivering them one by one to a chute which delivers them to a spring supporting device, this device in turn enabling the blanks to be clamped correctly in position between rotating parts which support them while they are cut and ground or finished. Features of the device according to the invention are that each button in turn is separately supported between a guide and spring fingers which serve together to deliver the blanks to a position in which they are clamped between two spindle members, immediately after which clamping the spring fingers recede and a grinding wheel or equivalent tool is brought into action so as to move over the edge of the blank, preferably in a curvilinear path, smoothing the whole circumferential surface before the parts of the spindle separate to release the blank. The support for the grinding disc is arranged to push aside the guide during the grinding operation so that it will not interfere with direct contact between the grinding disc and the blank. Directly the grinding is finished the parts of the spindle separate, the grinding wheel moves backwards, and a fresh button blank is delivered down the chute ready to be operated on. Instead of a grinding wheel, a cutting tool or other trimming device may be used. Again, the machine can be used as an automatic button lathe for the production of fancy shaped buttons.

The invention is illustrated in the accompanying drawings, in which:

Figure 7 is a detail view on an enlarged scale of the spring finger mechanism;

Figure 8 is a sectional view at right angles to Figure 7, and

Figure 9 is a plan view thereof;

Figure 10 is a detail view in elevation, and

Figure 11 is a corresponding plan view of the mechanism for holding the blanks in position while being trimmed;

Figure 12 is an enlarged sectional view of the member against which the blanks are clamped;

Figure 13 is an enlarged detail view of an indicating device to give warning when no blank is fed to the holder;

Figure 14 shows the grinding mechanism in elevation, and

Figure 15 is a corresponding plan view thereof;

Figure 16 shows a vertical section on the line XVI—XVI of Figure 15;

Figure 17 is a detail view in plan illustrating the grinding action;

Figures 18, 20, 22 and 24 are sectional elevations showing the spring finger mechanism and holding device in successive operating positions, and Figures 19, 21, 23 and 25 are corresponding plan views showing the successive positions of the grinding disc and holder;

Figure 26 is a circuit diagram;

Figure 27 is a plan view showing a modification in which the grinding disc moves parallel to the holder for the blanks;

Figure 28 is an elevation; and

Figure 29 is a plan view showing a modification in which a cutting tool is used.

Figure 1:
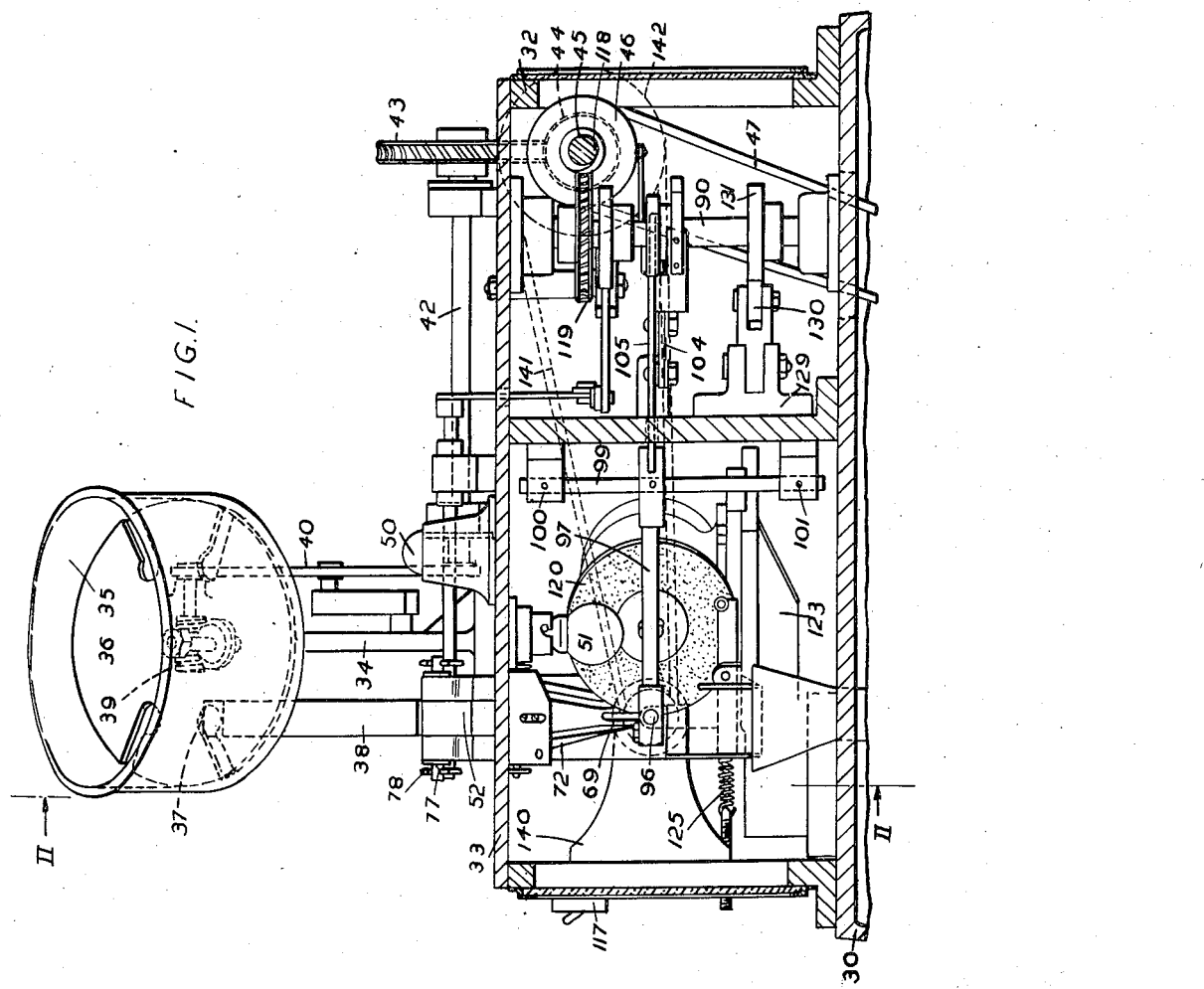
Figure 1 is a front view of the machine, in section on the line I—I of Figure 3.
Figure 2:
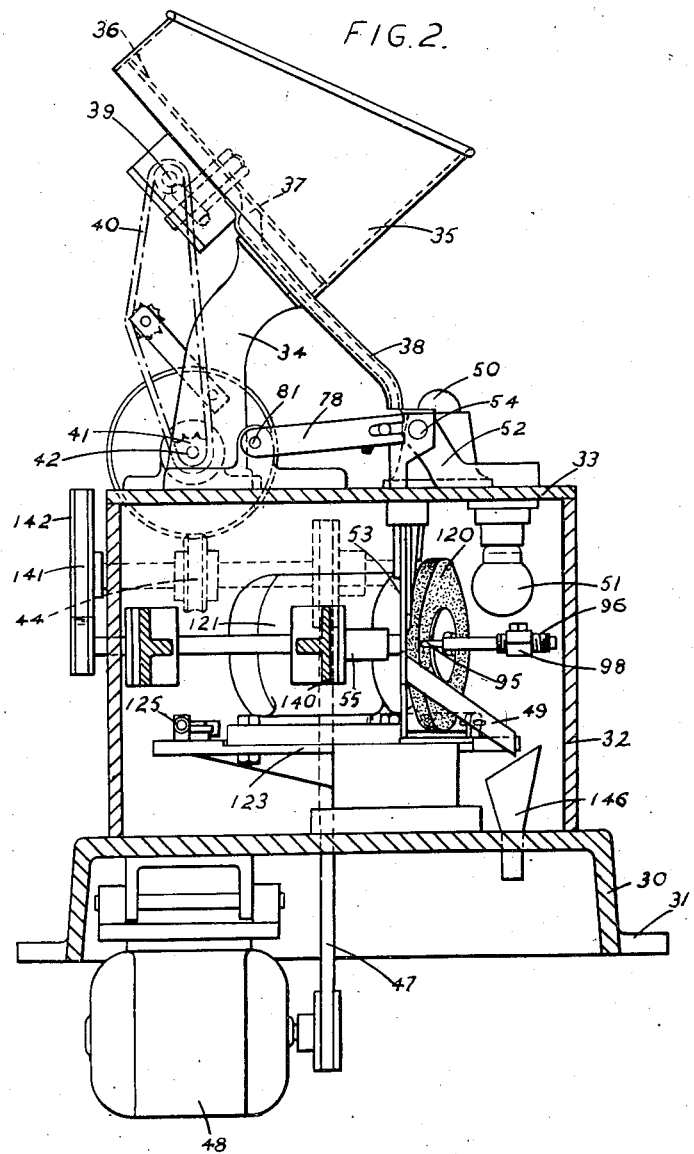
Figure 2 is a side elevation in section on the line II—II of Figure 1.
Figure 3:
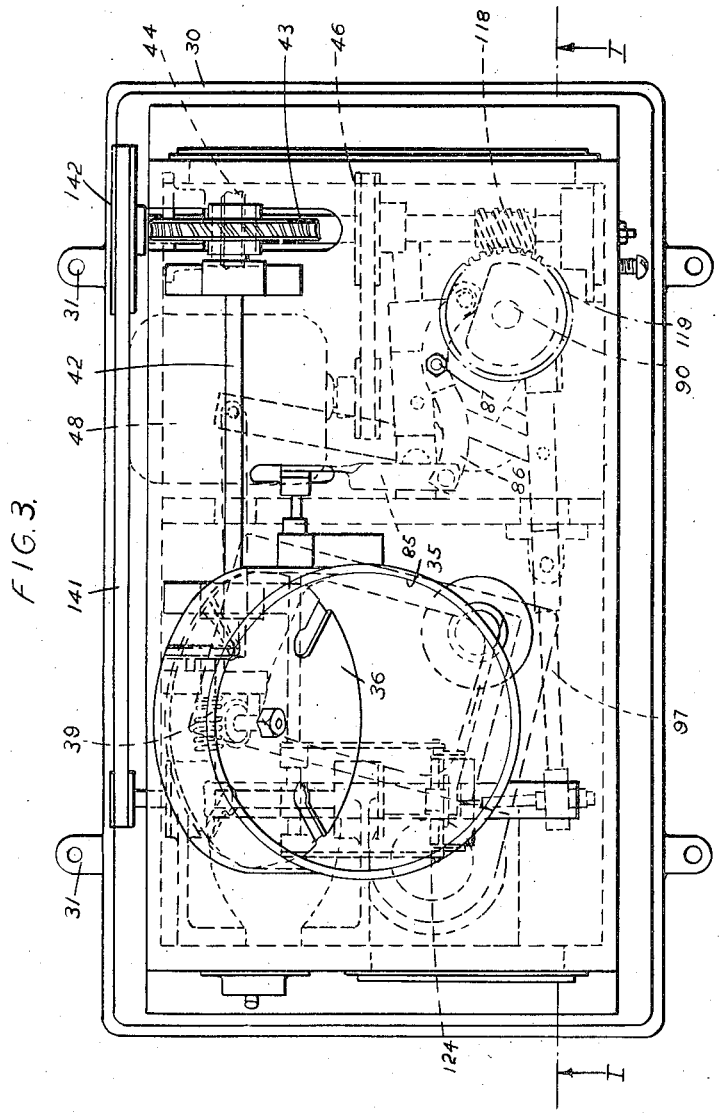
Figure 3 is a plan view.
Figure 4:
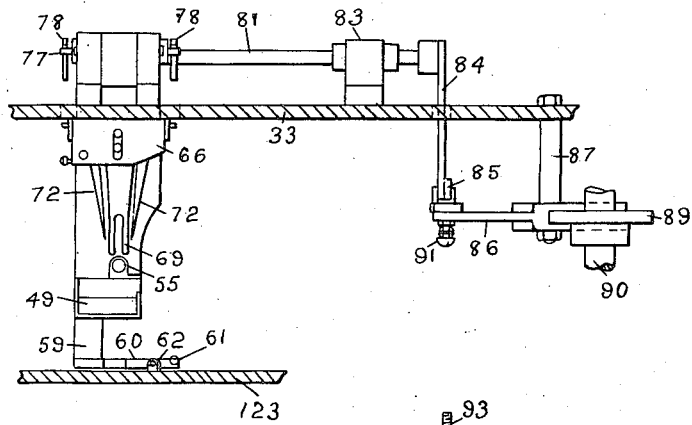
Figure 4 is a detail view in elevation of the spring finger mechanism which delivers the blanks to the rotating holder.

Referring to the drawings, Figures 1 to 3, a base 30 has lugs 31 by which it may be secured to a bench, and the base supports a frame 32 in which the machine is arranged. The cover 33 on this frame carries a bracket 34 supporting the hopper 35 for containing a supply of blanks to be trimmed. In the inclined base of this hopper is a rotating pick-up device of known type comprising a disc 36 with recesses for picking up blanks and dropping them one by one into a slot at 37 which leads to a feed chute 38. The disc 36 is rotated slowly by a worm gear 39 actuated by a chain 40 from a sprocket 41 on a shaft 42. The shaft 42 in turn is driven by a helical gear wheel 43 actuated by a helical pinion 44 on the main driving shaft 45 of the machine. The shaft 45 carries a pulley 46 driven by a belt 47 from an electric motor 48 mounted beneath the base 30, Figure 2.

The pick-up device consisting of the rotating disc 36 and slot 37 is so formed that it only accepts the blanks when it picks them up with the recessed face downwards, blanks entering the recesses the other way up being pushed out again as the disc rotates. The rate of rotation of the disc 36 is such as to deliver blanks to the chute 38 at the rate at which the holding and grinding device is ready to receive them, and an indicating or warning device hereinafter described causes a lamp 50 to be lit momentarily whenever a blank fails to be delivered for trimming. If this lamp 50 repeatedly shows the warning light it indicates to the attendant that the feed device requires attention or the hopper 35 needs replenishing. 51 is a lamp which is normally alight to illuminate the operative parts of the machine.

The blanks as they are delivered by the chute 38 fall between a stationary bracket 52 and a guide member 53 which is supported by pivot 54 on the said bracket. The guide member 53 is extended downwardly to straddle the rotating shaft 55 whose end 56, Figure 8, is shaped to fit the moulded face of the blank to be trimmed. The shaped face is called the "fashion" and will be so designated hereinafter. The shaft 55 is continuously actuated by a belt 141 from a pulley 142 on the end of the main driving shaft 45, as shown in Figure 3. The arm 57 of the guide member 53 on one side of the shaft 55 is extended downwardly and has secured thereto by bolts 58 an extension 59 carrying a tongue 60. This tongue is normally pulled by a spring 61 against a screw stop 62 so as to hold the guide member 53 in its upright position as in Figure 8, but to permit it to be pushed back when required as hereinafter described more particularly with reference to Figures 24 and 25. The arm 57 carries a channel or chute 49 for receiving the blanks when trimmed, and after release by the holding device as hereinafter described.

On the guide member 53 works a slide 63 carrying forks 64 which embrace the guide member and have pivoted thereto at 65 a plate 66 at the back of which is a blade 68 terminating in spring fingers 69 for holding the blanks as they fall from chute 38 over the face of the guide member 53. One blank 70 is shown supported by the fingers 69 in Figure 8. The fingers have inwardly bent ends adapted to overlie the back of the blank 70 and to engage its curved surface but preferably not to extend over the flash on the edge of the blank. The blade 68 is secured by studs 67 to the plate 66, and this plate carries a setscrew 71 which bears by its end against the guide member 53. By accurate adjustment of the setscrew 71 the fingers 69 can be set so as to leave the requisite clearance between them and the guide member 53 for permitting the blanks 70 to fall down until they rest upon the inwardly curved lower ends of the fingers 69, in the position indicated in Figure 8. Lateral fingers 72 fixed to guide 53 by screws 73, and adjustable in angular position when these screws are loosened, serve as lateral inclined guides for directing the blanks into a central position as they fall between the guide 53 and the blade 68, down to the curved ends of the spring fingers 69. A spring 74, attached at one end to a lug 75 secured by nut 76 to the back of the slide 63, has its other end attached to the plate 66, and serves to pull the plate, the blade 68 and its spring fingers 69 toward the guide member 53, as far as is permitted by the setscrew 71.

Figure 5:
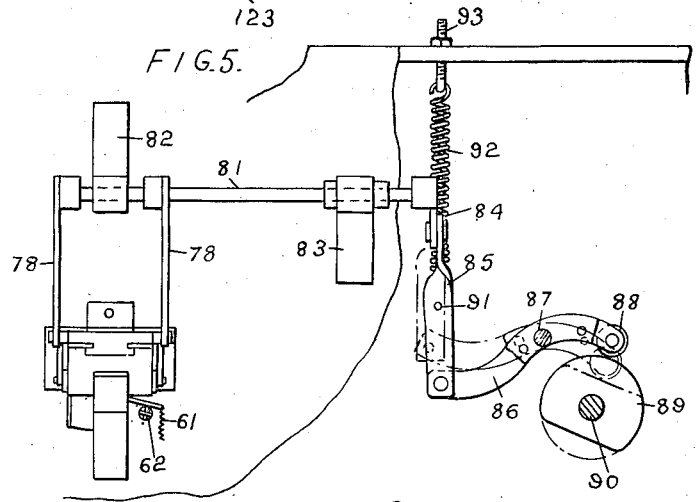
Figure 5 is a plan view corresponding to Figure 4.
Figure 6:
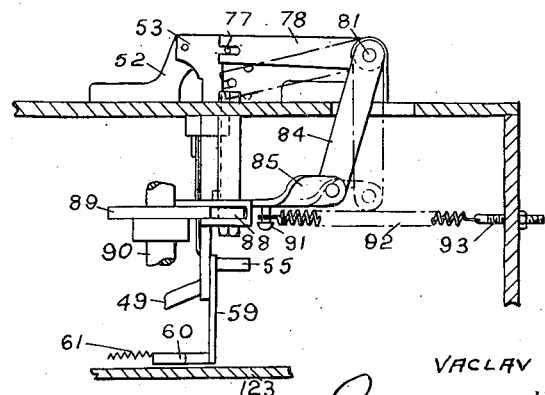
Figure 6 is an end view thereof.

The slide 63 carries projecting studs 77 above the cover plate 33, and lever arms 78 with forked ends engage with these studs for the purpose of raising and lowering the slide 63. The bracket 79 affixed to the slide carries a setscrew 80 which is adjustable to determine the limit of the downward movement of the slide as indicated in Figure 20, by coming against the cover 33. The lever arms 78 are secured to a shaft 81 carried in brackets 82 and 83 from the cover 33, and on the end of this shaft 81 is fixed a lever 84 which extends through a slot in the cover 33. The lower end of lever 84 has a pivotal connection to a link 85, whose other end is pivoted to the end of a lever 86. Lever 86 is supported to turn on a post 87 depending from the cover 33, and its other end carries a roller 88 which bears against a cam 89 fixed on a vertical shaft 90. This shaft 90 is driven by worm wheel 118 on the main driving shaft 45 gearing with worm 119 on shaft 90, Figure 1. The link 85 carries a stud 91 connected to a spring 92 whose other end is anchored by a screwstud 93 to a wall of the frame of the machine, this spring tending to keep the roller 88 pressed against the cam 89, and so to turn the lever arms 78 in the direction for lowering the slide 63 and the spring fingers 69. This lowering can only take place when the roller 88 comes upon the flat of the cam 89 as indicated in dotted lines in Figure 5.

When the slide 63 is lowered the spring fingers 69 descend from the position of Figure 18 to that of Figure 20 bringing the blank 70 to be trimmed opposite the "fashion" on the end of shaft 55, and immediately thereafter a holding device comprising a clamping member 95 moves forward and clamps the blank 70 against the "fashion" on the end of the continuously rotating shaft 55, the member 95 engaging with the centre of the back of the blank 70 between the spring fingers 69. The blank 70 snaps into engagement with the "fashion" on the end of shaft 55 and is thus accurately centred ready for trimming. The blank is immediately set in rotation by contact with the "fashion" on the rotating shaft, and the slide 63 now rises again under the action of cam 89 while the spring fingers 69 slide over the rounded rear face of the blank until they reach the position of Figure 22, ready to receive the next blank 70ª when delivered to them as in Figure 24.

The holding device or clamping member 95 is mounted and operated as indicated in Figures 10 and 11. It is on the reduced end of a screwstud 96 adjustable in the end of a lever 97 which is split and arranged to be clamped as at 98 upon the screw 96 to lock it in its position of adjustment. The lever 97 is mounted to turn on a vertical spindle 99 which is supported in brackets 100 and 101 on a wall 103 of the frame 32. The lever 97 has an arm 102 projecting beyond a slot through the wall 103 and connected by a link 104 to a lever 105. This lever 105 is pivoted at 106 on a bracket 107 secured by a bolt 108 to the wall 103, and its outer end is drawn downwardly by a spring 109 connected by a screwstud 110 to the base 30. The lever 105 also carries a roller 111 bearing on a cam 112 fixed to the shaft 90 already referred to. The cam 90 holds the lever 105 in the full line position of Figure 11 over an arc of movement of rather less than 180° of the shaft 90, causing the clamping member 95 to be withdrawn. When the roller passes over the inward slope of the cam 112 the lever 105 moves to the position shown in dotted lines, so advancing the clamping member 95 to engage the blank 70 with the "fashion" on the end of shaft 55, under the action of the spring 109.

As the machine is fully automatic so that one operator can normally tend a number of such machines running continuously, it is desirable to provide an indicator which will show when any machine is stopped due to jamming of a button in a chute or other cause of irregularity. For this purpose the lever arm 102 carries a resilient tongue 113 having an electrical connection at 114 to a lamp circuit, while a screwstud 115 mounted in insulation 134 on the base 30 is also connected in this circuit, as for example by a terminal 135 and conducting strip 136, indicated in Figure 13, while the contact-making end of tongue 113 is also shown in its various relative positions. The stud 115 is so adjusted that the end of tongue 113 does not make contact with it if clamping member 95 is stopped by the back of a blank 70, but if no blank is present the clamping member moves further until tongue 113 touches the end of screwstud 115. The circuit is as shown in Figure 26 where the members 113 and 115 are shown as being in the circuit of the warning lamp 50, supplied with current from a source at 116, and it is seen that the lamp 50 will only show a light if tongue 113 touches contact screw 115. A branch circuit from the source 116 supplies the other lamp 51, which serves for illuminating the machine, through a manually controlled switch 117 which may be on an end wall of the machine as indicated in Figure 1.

In the example of construction illustrated, the grinding disc 120 is mounted directly on the shaft of an electric motor 121 which may be of the totally enclosed type. The base of this motor is adjustably mounted on a swinging table 123 by bolts 122 engaging as shown in slotted holes in the motor base. The table 123 is adapted to turn in a horizontal plane about an axis 124, Figures 15 and 16. For this purpose a socket 143 under the table may accommodate ball bearings 144 which carry it upon a stud 145 capable of positional adjustment as may be required over the base 30, to determine the position of the axis 124. Attached to the table 123 is a spring 125 whose other end is connected to a screw stud 126 affixed to an end wall of the machine. The table is turned against the action of spring 125 by a link 127 passing through a slot in the inner wall of the machine and connected to one end of a lever 128 which is pivoted on a bracket 129 on this wall, and carries a roller 130 at its other end bearing upon a cam 131 on the vertical shaft 90.

The cam 131 holds the table 123 in the full line position of Figure 15 over about half of its angular movement, and then allows the table to turn slowly in a counter-clockwise direction to the position indicated in dotted lines in that figure, during which movement the edge of the grinding disc 120 sweeps over the edge of the blank 70 up to the position of Figure 25, trimming it with a rounding motion which imparts a smooth finish to the edge. The table now swings back slowly, doing further trimming if necessary by the disc 120. The action of the grinding disc 120 in removing flash from a blank 70 is illustrated to an enlarged scale in Figure 17. When adjustment of the grinding disc 120 is necessary, either to take up wear or to set it for operating on blanks of another size for example, the bolts 122 are loosened and the screw 132 engaging in a lug 133 on the side of the table is adjusted to slide the base of the motor across the table 123 to the required extent, after which the bolts 122 are tightened again.

The adjustable screw stop 62 against which the tongue 60 on the extension 59 of guide 53 bears, is on the table 123, as seen in Figures 14 and 15, and as the table turns to cause the edge of the grinding disc 120 to trim the edge of a blank 70, the stop 62 swings with the table 123, so causing the whole guide 53, with its slide 63 and spring fingers 69, to be pressed back, as indicated in Figures 23 and 24, in advance of the grinding disc 120. In this movement of course the guide 53 turns about its pivot at 54 as it is free to do against the action of spring 61. The space around the edge of the blank 70 is thus left clear for the advance of the grinding disc 120. When the disc moves back the tongue 60 with the guide 53 and its attachments return to the position of Figures 18 and 19, ready for the next cycle of operations, under the action of spring 61.

The "fashion" at 56 on the end of shaft 55 has been described hitherto as being formed on the shaft itself, but preferably it is formed on a spigot 137 fitted by a morse taper for example in a socket 138 on the end of the shaft 55, as shown in Figure 12. The shaft is shown as being supported in ball bearings 139 in a bracket 140 which projects inwardly from an end wall of the frame 32, as seen in Figure 1. The spigot 137 is thus interchangeable with other spigots having "fashions" upon them shaped to correspond with the various shapes and sizes of blanks on which it may be desired to operate. In general, these blanks will be button blanks with a recessed face which fits over the "fashion," but any similar disc-like blanks can of course be trimmed on this machine.

In the operation of the machine as described, particularly with reference to the successive views in Figures 18 to 25, it will be clear that when a blank 70 is fed from hopper 35 down the chute 38, it is received as in Figure 18 by the guide member 53 and spring fingers 69. These fingers then descend over the face of the guide 53 to the position of Figure 20 whereupon the clamping member 95 comes into action between the fingers 69 to hold the blank against the "fashion" on the end of rotating shaft 55; the fingers 69 then recede again as in Figure 22. The table 123 now turns causing the grinding disc 120 to move over the edge of the blank as in Figure 25, or Figure 17, while the guide member 53 is pushed back by the stop 62. The table 123 returns slowly to the position of Figure 15 (full lines) or Figure 19, and a fresh cycle commences. The next blank 70ª may be caused to drop into position at any convenient stage, but is here shown as having dropped at the stage represented in Figure 24 while the guide 53 is pressed back by stop 62 on table 123. As the table returns to the position of Figures 19 and 15 (full lines) the cam 112 causes the clamping member 95 to move back, releasing the trimmed blank 70 which falls down the chute 49 and into a receiving funnel 146, Figure 2, which directs it into a suitable receptacle (not shown).

It should be noticed particularly that, as far as is possible, all the movements involving engagement with the blank are made under spring action, the return movements being positive. Thus, the pivoting movement of the guide 53 returning it to its upright position is effected by spring 61; the lowering of the slide 68 and fingers 69 is due to spring 92; the gripping action of the fingers 69 is exercised by spring 74; the engagement of the clamping member 95 is exercised by the spring 109; the forward movement of the table 123 with the grinding disc 120 takes place under the action of spring 125, while the disc is meeting and grinding away the flash on the blank. In all these operations, if any obstruction is met with, no harm is done as the spring action permits the moving part to hang back if obstructed.

In view of the way in which the blank is clamped, and of the way in which the grinding disc moves over it, there is very little risk that the grinding disc will displace the blank laterally because the pressure is mainly toward the face of the "fashion," or along the axis of shaft 55, the lateral component being relatively small. Moreover, as the grinding disc 120 moves into action over substantially the whole of its effective surface during the grinding operation there is no tendency to groove it or to choke it locally with dust, and the grinding wheel will therefore operate continuously for long periods without redressing.

The invention has been described as applied to the trimming of the edges of button blanks, but if the flash or irregularities to be trimmed are not on the edge the same machine can still be used provided that the grinding or cutting surface is arranged to move over the plane of the flash or projection, which might for example be part way down the rounded surface of the back of a button or other article. Obviously by changing the position of the pivot pin 145 carrying the table 123 of the grinding member 120 it is possible to make it move in a curvilinear path so as to produce a rounded surface of any desired curvature, which can be convex or concave, or a straight line motion can be used when a suitably shaped surface is to be formed or smoothed.

Figure 27 shows how the disc 120ª and motor 121ª can be given a straight motion by mounting the table 147 carrying the motor and disc to slide on the machine base 30, and providing a lever 148 with a pivotal connection to a slider 152 guided between projections 149 on the table 147 for shifting it to and fro. The lever 148 is pivoted on a bracket 151 and engages the cam 131 on shaft 90 by means of a roller 150, while a spring 125ª pulls the table 147 in a direction to move the disc 120ª over the edge of the blank. The motor is adjustable on its table as in the first described construction by bolts 122ª engaging in slots and by a screw 132ª passing through a lug 133ª on the table.

The grinding disc is only one example of a suitable dressing tool and a blade can be used to act as a cutting tool if preferred. Figures 28 and 29 show how a cutting tool can be used to serve any required purpose in trimming or shaping the blank. In this case a blank 70ᵇ delivered over the guide member 53 as before is clamped upon the end of shaft 55ᵇ and by the member 95 actuated as in Figures 1 to 25, and the saddle 154 carrying the tool slides by guides 153 on the base 30 of the machine. The saddle 154 is formed with projections 149ª for guiding a slide 152ª actuated by the same mechanism as that of Figure 27 from the cam 131 on shaft 90. The cutting tool is here shown at 155 as a tool with a profiled face which may turn a correspondingly shaped or grooved face on the blank. Of course if the tool 155 were shaped to move over the edge of the blank it would trim it but with a straight line motion instead of a curvilinear one.

I claim:

1. A machine for shaping a rounded edge on circular blanks comprising a shaft with an end portion fashioned to fit against one face of each such blank, a holding member adapted to clamp a blank against such fashioned end portion, means for rotating said shaft, means for delivering blanks severally in succession to the zone between said fashioned end portion and said holding member, means for advancing and retracting said holding member, a table and a shaping tool carried thereupon, a pivotal support for said table transverse to said shaft and means for swinging said table about such pivotal support in a direction such as to cause said shaping tool to sweep around the edge of a blank when clamped between said fashioned end portion and said holding member.

2. A machine for shaping a rounded edge on circular blanks comprising a shaft with an end portion fashioned to fit against one face of each such blank, a holding member adapted to clamp a blank against such fashioned end portion, means for rotating said shaft, means for delivering blanks severally in succession to the zone between said fashioned end portion and said holding member, means for advancing and retracting said holding member, a table and a shaping tool carried thereupon, said shaping tool comprising a grinding disc and means for driving the same, means for moving said table about an axis transverse to said shaft in a curved path such that the edge of said grinding disc sweeps across the edge of a blank when gripped between said fashioned end portion and said holding member.

3. A machine for shaping circular blanks comprising a shaft with an end portion fashioned to fit against one face of each such blank, a holding member and means for pressing it with resilient pressure against a blank when applied to said fashioned end portion, means for rotating said shaft, a guide member adapted to straddle said fashioned end portion, a support for said guide member adapted to permit movement thereof back from said fashioned end portion, a spring adapted to return said guide member to its normal position over said fashioned end portion, means for feeding said blanks one by one over the face of said guide member, a table and a shaping tool carried thereon, means for moving said table about an axis transverse to said shaft in a curved path such that the edge of said tool sweeps across the edge of such blank when clamped between said fashioned end portion and said holding member, and means in connection with the support for said tool adapted to press back said guide member as said tool advances toward and over the edge of such blank.

4. A machine for shaping circular blanks comprising a shaft with an end portion fashioned to fit against one face of each such blank, a holding member adapted to clamp a blank against such fashioned end portion, means for rotating said shaft, means for delivering blanks severally in succession to the zone between said fashioned end portion and said holding member, a shaping tool and a table therefor, means supporting said table in such manner that it can move in a direction to traverse said tool across the plane of such blank when clamped as aforesaid, cam mechanism adapted to retract said holding member and said table, and spring means for advancing said holding member and said table in the direction in which said holding member and said shaping tool move into engagement with such blank when clamped as aforesaid.

5. A machine for shaping circular blanks comprising a receptacle for the blanks and means for delivering said blanks one by one from said receptable, a guide member to which said blanks are delivered, a slide associated with said guide member, a blade formed with spring fingers attached to said slide, a shaft having a fashioned end portion adapted to fit against one face of each such blank said shaft being so disposed in relation to said guide member as to receive such blanks on its fashioned end portion when delivered thereto by said guide member and said spring fingers, a holding member adapted to clamp such blanks against said fashioned end portion on said shaft, and means for shaping the exposed surfaces of said blanks when held by said holding member and said fashioned end portion, in association with means for driving said shaft, and means for operating said slide, said holding member and said shaping means, said operating means comprising cams adapted to retract said slide, said holding member and said shaping means respectively, and springs adapted to advance said slide in the direction for feeding a blank over the face of said fashioned end portion, to advance said holding member toward said fashioned end portion on said shaft, and to advance said shaping means towards such blank when clamped between said fashioned end portion and said holding member.

6. A machine for shaping circular blanks comprising a shaft with an end portion fashioned to fit against one face of each such blank, a holding member adapted to press a blank against such fashioned end portion, means for rotating said shaft, a guide member adapted to straddle said fashioned end portion, a pair of spring fingers and a slide supporting the same adapted to move over said guide member toward and away from said fashioned end portion, means for delivering blanks severally to said guide member and for traversing said slide and said spring fingers along said guide member toward and away from said fashioned end portion, spring-actuated mechanism for moving said holding member toward said fashioned end portion and between said spring fingers, positive means for withdrawing said holding member intermittently, a grinding member, and means for supporting and traversing said grinding member such as to cause said grinding member to move in a curved path about the edge of such blank when clamped between said holding member and the fashioned end portion on said shaft.

VACLAV NACHAZEL.

REFERENCES CITED

The following references are of record in the file of this patent:

UNITED STATES PATENTS

| Number | Name | Date |
|---|---|---|
| 639,910 | Shantz | Dec. 26, 1899 |
| 1,713,257 | Carris | May 14, 1929 |
| 1,863,737 | Witte | June 21, 1932 |
| 1,892,363 | Raule | Dec. 27, 1932 |
| 2,405,367 | Nichols | Aug. 6, 1946 |